Figure 1:
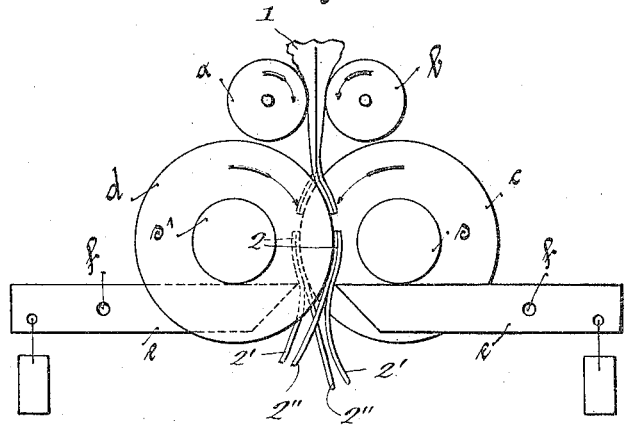

A. DE BACK.
METHOD OF RECOVERING IRON, STEEL, AND THE LIKE FROM WASTE ENAMELED ARTICLES.
APPLICATION FILED NOV. 12, 1910.

1,196,342.

Patented Aug. 29, 1916.

UNITED STATES PATENT OFFICE.

ALFRED DE BACK, OF ESSEN-ON-THE-RUHR, GERMANY, ASSIGNOR, BY MESNE ASSIGNMENTS, TO GOLDSCHMIDT DETINNING COMPANY, OF NEW YORK, N. Y., A CORPORATION OF NEW JERSEY.

METHOD OF RECOVERING IRON, STEEL, AND THE LIKE FROM WASTE ENAMELED ARTICLES.

1,196,342.  Specification of Letters Patent.  Patented Aug. 29, 1916.

Application filed November 12, 1910. Serial No. 591,982.

*To all whom it may concern:*

Be it known that I, ALFRED DE BACK, a subject of the King of Hungary, and resident of Essen-on-the-Ruhr, in the German Empire, have invented a new and useful Method of Recovering Iron, Steel, &c., from Waste Enameled Articles, of which the following is an exact specification.

My invention relates to a method of recovering iron, steel, etc., from waste enameled articles, such as iron pots and vessels, by entirely removing the enamel from the metal and separating it therefrom.

In the methods and machines heretofore used for recovering iron, steel, etc., from sheet metal waste articles, it has been necessary to keep the iron articles treated as free as possible from the enameled articles because the addition of even a relatively small percentage of enamel to the iron considerably reduces the value of the metal to be recovered, the decrease in value often amounting to two-thirds.

Attempts have been made to break off or crack the enamel mechanically from sheet metal articles, for the purpose of recovering the steel or iron, by stamping these articles in suitable machines. In the machines heretofore used it has, however, been impossible to remove the enamel from the interior of such articles, and the product obtained has always been a very inferior one.

I have found that it is possible to recover iron or steel free from enamel from sheet metal articles, by treating the enameled waste articles in such a manner that the enamel is first thoroughly crushed by compression, after which the crushed enamel in the form of enamel particles is readily separated from the metal.

I prefer to compress and flatten the enameled metal waste articles mechanically by compressing them between crushing rollers, and then cutting them up into strips between strong, rotary, steel disks, or cutters, after which, preferably the strips are opened, to accomplish which I force the strips against suitable opening devices or shapers which are usually arranged below the cutters. When the enameled waste material is subjected to such treatment as this, the enamel crushed by the rollers falls away from the inner surfaces of the opened strips as well as from the outer surfaces thereof or may be separated therefrom by screening, or in any other suitable way.

This method of recovering iron, steel, etc., from waste enameled articles is preferably carried out in a single machine in which the articles are first compressed and the enamel crushed or broken up, after which the articles are cut by the machine into strips and these strips opened up sufficiently by the mechanism to permit the enamel to fall away from the inner surfaces of the layers of the opened strips, as well as from the outer surfaces thereof.

Figure 2:
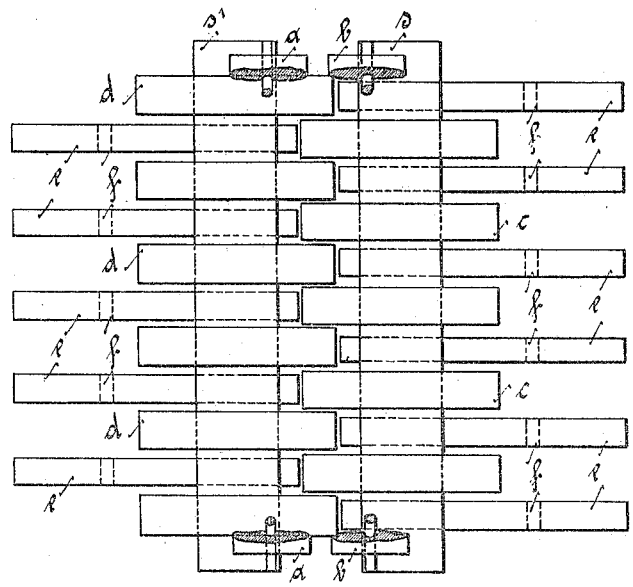

In the accompanying drawing a machine suitable for carrying out this process is illustrated in Figure 1 in end elevation, and in Fig. 2 in plan, with parts of the crushing rollers broken away to illustrate the other mechanism.

In the machine illustrated the enameled articles to be treated are fed between crushing rollers, such as $a$ and $b$, which are intended to be rotated in opposite directions. The articles are flattened between the rollers and the enamel thereon or between adjoining surfaces is thoroughly crushed, after which the articles pass to suitable cutters, such for example, as $d$ and $c$, which are here shown as made up of two series, fixed on parallel rotary carriers or shafts, such as $s$ and $s'$, these shafts being also intended to rotate in opposite directions to each other. The cutters of one series are staggered with respect to those of the other, the arrangement being such that one disk or cutter carried by each shaft will rotate between two disks or cutters carried by the other shaft and will preferably project a considerable distance into the space between such cutters of the opposite series. By means of such heavy disks as are shown at $d$ and $c$, the enameled articles represented at 1, are cut into strips 2, which strips are then forced against suitable opening devices or shapers, such as shown at $e$, which are disposed in such positions and so mounted that each of the same scrapes against the adjacent layer 2' of a strip to offer greater resistance to the movement of such layer than is offered to the movement of the layer or layers 2" of the strip adjacent the cutter. This results in a separating action of the layers 2' and 2″ as the strips pass beyond the opening devices e, as indicated in Fig. 1, so that the broken enamel confined between the layers is freed and permitted to fall away. The opening devices or shapers shown herein are illustrated as mounted on pivots, f, so that they can have an oscillating or vibratory movement, and near their working ends are held against the rotary carriers, s and s′, which are of relatively large diameter, the devices e being held in their normal working positions by any suitable means, such as the heavy counterweights shown. These opening devices are shown herein as comprising two sets, the devices of these sets being staggered also, as are the cutters, and being so associated with said cutters as substantially to fill the spaces between the cutters of their own sets of cutters, each opening device, however, being disposed opposite to, or in alinement with, a cutter of the opposite set.

Having now fully described my said invention, what I claim is:

1. The method of removing enamel from waste enameled articles, which consists in compressing the articles and crushing the enamel thereon and positively opening the layers of said articles to permit removal of the enamel between the layers.

2. The method of removing enamel from waste enameled articles, which consists in compressing the articles and crushing the enamel thereon, cutting said articles into portions and opening the layers of the cut portions to permit removal of the enamel between the layers.

3. The method of removing enamel from waste enameled articles, which consists in compressing the articles and crushing the enamel thereon, cutting said articles into strips, and opening the strips to permit removal of the enamel on the inside of the same.

4. The method of removing enamel from waste enameled articles, which consists in rolling said articles to flatten them and crush the enamel thereon, and positively re-opening the flattened articles to permit removal of the inside enamel.

5. The method of removing enamel from waste enameled articles, which consists in rolling said articles to flatten them and crush the enamel thereon, cutting the flattened articles into strips, and opening the layers of said strips to permit removal of the enamel between said layers.

In testimony whereof I have signed this specification in the presence of two subscribing witnesses.

ALFRED DE BACK. [L. S.]

Witnesses:
CHAS. J. WRIGHT,
WALTER VONNEGUT.